United States Patent
Ito et al.

(10) Patent No.: US 9,298,989 B2
(45) Date of Patent: Mar. 29, 2016

(54) METHOD AND APPARATUS FOR RECOGNIZING ACTIONS

(71) Applicant: FUJITSU LIMITED, Kawasaki-shi, Kanagawa (JP)

(72) Inventors: Fumito Ito, Kita (JP); Shohei Kuwabara, Itabashi (JP); Sayaka Suwa, Itabashi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/551,162

(22) Filed: Nov. 24, 2014

(65) Prior Publication Data

US 2015/0154449 A1 Jun. 4, 2015

(30) Foreign Application Priority Data

Nov. 29, 2013 (JP) ................................ 2013-247978

(51) Int. Cl.
*G06K 9/00* (2006.01)
*G06T 7/40* (2006.01)
*G06K 9/46* (2006.01)

(52) U.S. Cl.
CPC ........ *G06K 9/00624* (2013.01); *G06K 9/00375* (2013.01); *G06K 9/4652* (2013.01); *G06T 7/408* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,588,467 | B2 * | 11/2013 | Yoon .................. | G06K 9/00382 382/103 |
| 8,615,108 | B1 * | 12/2013 | Stoppa ................. | G06K 9/4671 382/103 |
| 9,135,753 | B2 * | 9/2015 | Raghoebardayal ... | G06T 19/006 |
| 2012/0314902 | A1 * | 12/2012 | Kimura ................... | G06F 3/017 382/103 |
| 2013/0343605 | A1 * | 12/2013 | Dal Mutto ......... | G06K 9/00355 382/103 |
| 2014/0119599 | A1 * | 5/2014 | Dal Mutto ........... | G06K 9/6202 382/103 |
| 2014/0211991 | A1 * | 7/2014 | Stoppa ............... | G06K 9/00355 382/103 |
| 2014/0211992 | A1 * | 7/2014 | Stoppa ................. | G06K 9/4671 382/103 |
| 2015/0243100 | A1 * | 8/2015 | Abovitz ............. | G06K 9/00671 345/633 |
| 2015/0248170 | A1 * | 9/2015 | Abovitz ............. | G06K 9/00671 345/633 |

FOREIGN PATENT DOCUMENTS

| | | |
|---|---|---|
| JP | 2001-128814 A | 5/2001 |
| JP | 2011-215921 A | 10/2011 |
| JP | 2011-253344 A | 12/2011 |
| JP | 2012-256098 A | 12/2012 |

* cited by examiner

*Primary Examiner* — Anand Bhatnagar
(74) *Attorney, Agent, or Firm* — Fujitsu Patent Center

(57) ABSTRACT

An information processing apparatus obtains a picture containing an image of a person from an imaging device. Also obtained are first data indicating distance of the person and other subjects seen in the picture from the imaging device, second data indicating distance of a wrist of the person from the imaging device, and third data indicating a coordinate position of the wrist in the picture. The information processing apparatus extracts a set of pixels whose coordinates fall within a specified coordinate range defined around the coordinate position of the wrist and whose distances from the imaging device fall within a specified distance range defined around the distance of the wrist. Then based on a ratio representing how many of the extracted pixels have a distinctive color tone, the information processing apparatus determines whether the person has picked up an object.

15 Claims, 18 Drawing Sheets

ACTION RECOGNITION SYSTEM

SENSOR DEVICE

ACTION RECOGNITION APPARATUS

FIG. 11

| PRODUCT DATA TABLE | 211 |
|---|---|
| PRODUCT ID | AREA DATA |
| PRODUCT#1 | (25,10), (10,10), (15,20), (25,20) |
| PRODUCT#2 | (40,10), (25,10), (25,20), (35,20) |
| ⋮ | ⋮ |

FIG. 12

| HAND AREA DATA TABLE ||||
|---|---|---|---|
| HAND AREA ID | STATE | DISTINCTIVE COLOR PIXEL COUNT | INDISTINCTIVE COLOR PIXEL COUNT |
| HAND AREA#1 | IN | 10000 | 0 |
| HAND AREA#1 | OUT | 8000 | 2000 |
| HAND AREA#2 | IN | 10000 | 0 |
| ⋮ | ⋮ | ⋮ | ⋮ |

215a

FIG. 13
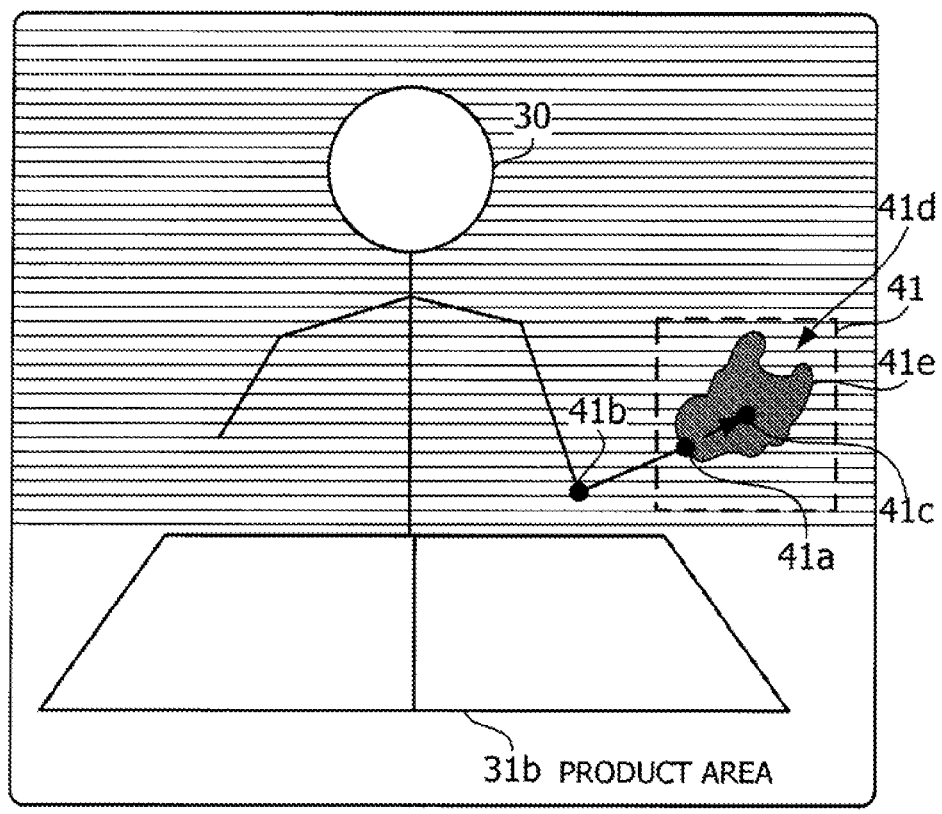
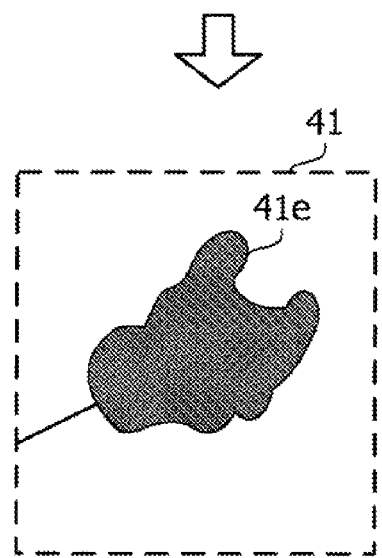

METHOD AND APPARATUS FOR RECOGNIZING ACTIONS

CROSS-REFERENCE TO RELATED APPLICATION

This application is based upon and claims the benefit of priority of the prior Japanese Patent Application No. 2013-247978, filed on Nov. 29, 2013, the entire contents of which are incorporated herein by reference.

FIELD

The embodiments discussed herein relate to a method and an apparatus for recognizing actions.

BACKGROUND

Recent developments in the field of action recognition technology have enabled detection of particular actions that a person may perform, on the basis of pictures or videos taken by an imaging device. A part of such development efforts has been directed to techniques for determining whether a person has picked up an object. Such actions may be detected by analyzing data of pictures containing images of a person.

For example, one proposed technique extracts some appropriate areas from a given picture to detect entry or exit of a human hand, examines the three-dimensional position of a hand in each of the extracted areas, and determines whether an object has been taken out of its original place, on the basis of variations in the top-edge width of an area containing the hand. Another proposed technique captures frame images of, for example, a product shelf and evaluates frame-to-frame differences to detect whether a product is picked up from the shelf. See, for example, the documents listed below.

Japanese Laid-open Patent Publication No. 2001-128814
Japanese Laid-open Patent Publication No. 2011-253344

The above-described conventional techniques may, however, exhibit some inaccuracy in particular cases. For example, the technique based on frame-to-frame differences may mistakenly detect that a product is picked up in the case where the product has actually fallen off the shelf as a result of an accidental contact with a customer's body.

SUMMARY

In one aspect of the embodiments discussed herein, there is provided a method for recognizing actions by using an information processing apparatus. This method includes: obtaining, by the information processing apparatus, a picture containing an image of a person from an imaging device, as well as first data indicating distance of the person and other subjects seen in the picture from the imaging device on an individual pixel basis, second data indicating distance of a wrist of the person from the imaging device, and third data indicating a coordinate position of the wrist in the picture; extracting, by the information processing apparatus, a set of pixels from the obtained picture whose respective coordinates fall within a specified coordinate range defined around the coordinate position of the wrist and whose respective distances fall within a specified distance range defined around the distance of the wrist; and determining, by the information processing apparatus, whether the person has picked up an object, based on a ratio representing how many of the extracted pixels have a distinctive color tone.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates an example of a product data table;

FIG. 12 illustrates an example of a hand area data table;

FIG. 13 illustrates an example of extraction of a hand area;

DESCRIPTION OF EMBODIMENTS

Several embodiments will be described below with reference to the accompanying drawings.

(a) First Embodiment

Figure 1:
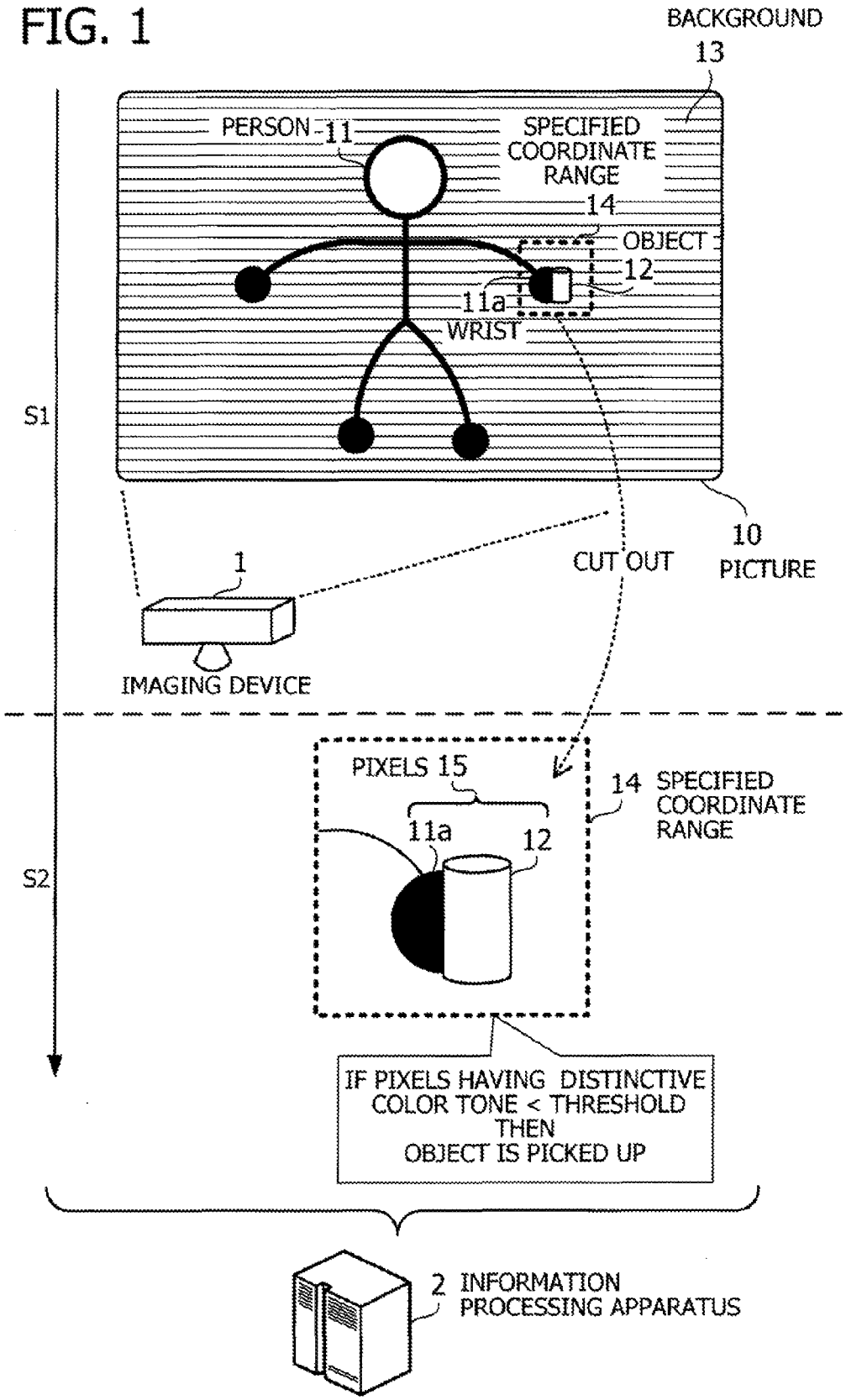
FIG. 1 illustrates an exemplary process executed by an information processing apparatus according to a first embodiment.

FIG. 1 illustrates an exemplary process executed by an information processing apparatus according to a first embodiment. Seen in the middle part of FIG. 1 is an imaging device 1 that takes still or video pictures in a specific view field to which it is directed. Pictures captured by the imaging device 1 are sent to an information processing apparatus 2 so as to determine whether a person seen in the pictures has picked up a particular object. This information processing apparatus 2 may be, for example, a computer or other processing devices.

Specifically, the information processing apparatus 2 receives data of a picture captured by the imaging device 1, which contains an image of a person and one or both of his or her wrists. The information processing apparatus 2 obtains the distance of each such subject from the imaging device 1. This distance information is provided for each individual pixel constituting the picture. The information processing apparatus 2 also obtains the distance of a coordinate point representing the person's wrist from the imaging device 1.

The information processing apparatus 2 may obtain these pieces of data directly from the imaging device 1 or via a storage medium. The imaging device 1 may be configured to measure the two kinds of distances noted above and send them to the information processing apparatus 2. Alternatively, a separate distance sensing device (not illustrated) may be used to perform the measurement and send the result to the information processing apparatus 2.

The following description may use the term "wrist coordinate" to refer to the above-noted coordinate point representing the position of a wrist of a person. The description may also use the term "wrist distance" to refer to the above-noted distance of the wrist coordinate from the imaging device 1.

The information processing apparatus 2 extracts a set of pixels from the obtained picture whose respective coordinates fall within a specified coordinate range around the wrist coordinate, and whose respective distances fall within a specified distance range around the wrist distance. The extracted pixels may include pixels whose color code values indicate a distinctive color tone. Based on the ratio of those pixels having a distinctive color tone to all the extracted pixels, the information processing apparatus 2 determines whether the person has picked up an object.

Referring to the specific example illustrated in FIG. 1, the following description explains how the information processing apparatus 2 recognizes an action. It is assumed that the information processing apparatus 2 has obtained data of a picture 10 captured by the imaging device 1, including an image of a person (subject), as well as the distance of that person from the imaging device 1 at each individual pixel and the distance of a coordinate point representing his or her wrist 11a from the imaging device 1.

As seen in the upper half of FIG. 1, the picture 10 is formed from images of the following distinct subjects: person 11, object 12 and background 13. The picture 10 has a specified coordinate range 14 defined as, for example, an area of pixels around the coordinate of the wrist 11a of the person 11, with a fixed height and a fixed width. This specified coordinate range 14 contains at least one hand of the person 11 and its surrounding area. In the case where the person 11 holds an object 12 in his or her hand, it is highly likely that the specified coordinate range 14 also contains an image of the object 12.

Relative to the position of the imaging device 1, a range of distance may be specified as, for example, an area around the position of one wrist 11a of the person 11. This specified distance range contains at least one hand of the person 11 and its surrounding area. In the case where the person 11 holds an object 12 in his or her hand, it is highly likely that the specified distance range contains the distance of that object 12. The distance between the background 13 and imaging device 1, on the other hand, does not usually fall within the specified distance range around the wrist 11a.

The information processing apparatus 2 extracts a set of pixels whose coordinates fall within the specified coordinate range 14 and whose distances fall within the specified distance range (step S1). Specifically, this step S1 extracts a set of pixels 15 from the specified coordinate range 14, excluding pixels of the background 13 whose distances are out of the specified distance range.

The image of the person 11 may contain several chunks of pixels representing his or her exposed skin. These pixels have a distinctive color tone, such as pale orange or the like, whereas the pixel representing an object 12 do not. The information processing apparatus 2 calculates a ratio of pixels having a distinctive color tone to the extracted set of pixels 15. In other words, this ratio indicates how much part of the extracted set of pixels 15 represents the skin of the person 11.

The information processing apparatus 2 now determines whether the person 11 has picked up an object 12, based on the calculated ratio of pixels having a distinctive color tone (S2). More specifically, the pixels having a distinctive color tone make up a certain population in the extracted set of pixels 15 when the hands of the person 11 are empty. The ratio of such distinctive pixels goes down when the person 11 takes hold of an object 12. The information processing apparatus 2 thus compares the calculated ratio with, for example, a previously given threshold. If the ratio falls below the threshold, the information processing apparatus 2 recognizes that the person 11 has picked up an object 12.

The information processing apparatus 2 may be configured to execute the above calculation of pixel ratios on two occasions and compare the two ratios. For example, the first occasion is when one hand of the person 11 of interest enters a specific area where an object 12 lies. The second occasion is when the hand exits from the same specific area. Then based on the difference between these two ratios, the information processing apparatus 2 determines whether the person 11 has picked up an object 12.

As mentioned previously, there is a proposed technique that relies on the differences between frame images captured by an imaging device to determine whether an object is picked up. This conventional technique, while applicable to the case illustrated in FIG. 1, could mistakenly determine that a person has picked up a product if the person unintentionally touched a product and moved it out of the frame range of the imaging device 1.

In contrast, the proposed information processing apparatus 2 of the first embodiment monitors the ratio that indicates how many of the pixels 15 extracted from a picture 10 have a distinctive color tone. Based on this ratio, the information processing apparatus 2 determines whether the person 11 of interest has picked up an object 12. The object 12 may be moved to a place out of the frame due to the person's contact with the object 12 or may happen to move from its intended location. In these cases, the pixels representing the object 12 would not be contained in the specified coordinate range 14. For this reason, the information processing apparatus 2 would not misinterpret such movement of the object 12 as a grasping action by the person 11. The proposed information processing apparatus 2 thus achieves the purpose with a better accuracy.

As can be seen from the above explanation, the information processing apparatus 2 obtains the distance between the imaging device 1 and the wrist 11a seen in the picture 10 and extracts from a specified coordinate range a set of pixels 15 whose respective distances fall within a specified distance range. The information processing apparatus 2 classifies these pixels depending on whether they have a distinctive color tone. The load of this pixel classification task is not significant because the task is performed only within a limited set of pixels 15 in which a hand is supposed to be seen. The smallness of this set of pixels 15 means an increase in the relative share of pixels having a distinctive color tone, which contributes to more accurate determination of whether an object 12 has been picked up.

It is further noted that the proposed method relies not on the number of pixels having a distinctive color tone, but on the ratio of such pixels in the extracted set of pixels 15. This difference makes it possible to detect an object 12 being held in a hand, regardless of the angle of the wrist 11a in the picture 10.

(b) Second Embodiment

Figure 2:
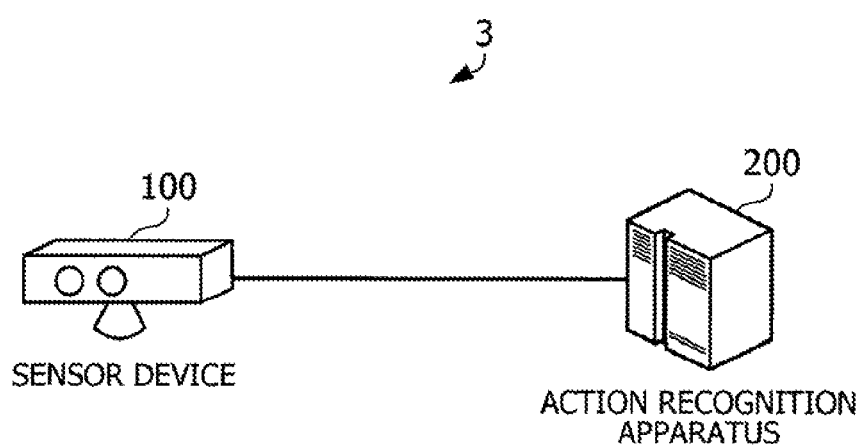
FIG. 2 illustrates an example of an action recognition system according to a second embodiment.

FIG. 2 illustrates an example of an action recognition system according to a second embodiment. The illustrated action recognition system 3 includes a sensor device 100 and an action recognition apparatus 200, both located in a retail shop of particular products. It is also possible to place the sensor device 100 alone in the shop, with a connection to the action recognition apparatus 200 located in other premises. The sensor device 100 may have various functions, part of which works as an implementation of the imaging device 1 discussed in the first embodiment. The action recognition apparatus 200 is an implementation of the foregoing information processing apparatus 2 of the first embodiment.

The sensor device 100 has the function of capturing pictures of at least an area in the shop space where products are displayed for sale. For example, the sensor device 100 may be directed at a particular product showcase (not illustrated). The sensor device 100 is also capable of measuring the depth of each pixel in captured pictures and outputting the measurements as depth data. The term "depth" refers to the distance of each pixel of the captured subject relative to the sensor device 100.

The sensor device 100 further analyzes skeletal features of a person (who is a customer or consumer in the present context) seen in the picture. Specifically, the sensor device 100 detects at least wrists and elbows of the customer and outputs skeletal data indicating them. More specifically, the skeletal data includes information on the position of each detected skeletal feature. The position information includes the in-picture coordinates (i.e., local coordinates within a picture) and the depths of skeletal features.

The sensor device 100 transmits its output data to the action recognition apparatus 200, which includes data of captured pictures, measured depths of each pixel, and skeletal data of detected features. This data transmission from the sensor device 100 may be performed at predetermined time intervals.

The action recognition apparatus 200 is actually a computer configured to recognize particular behavior of customers. Each time a new picture arrives from the sensor device 100 along with some related data, the action recognition apparatus 200 analyzes the received skeletal data, picture data, and the like to determine whether a customer seen in the picture has picked up a product. When such behavior of a customer is detected, the action recognition apparatus 200 outputs information about the product to a display device or records it in a log file.

What is detected by the action recognition apparatus 200 is not limited to the example described above, but may vary with demand. For instance, the action recognition apparatus 200 may be programmed to detect that a person has simply passed in front of products, or has directed his or her attention to a product, or has manifested interest in a product.

Figure 3:
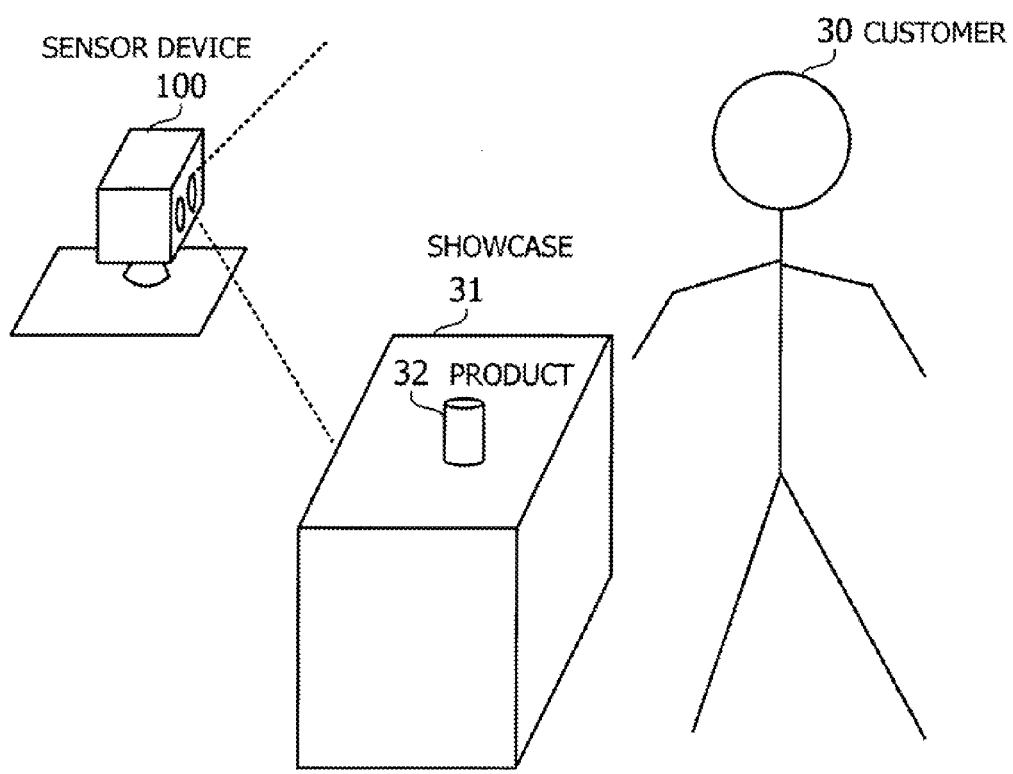
FIG. 3 illustrates an exemplary arrangement of a sensor device.

FIG. 3 illustrates an exemplary arrangement of a sensor device. As seen in FIG. 3, a product 32 is placed on top of a showcase 31, and the space on the right-hand side is where customers are allowed to walk around. A sensor device 100 is situated on the opposite side of the showcase 31, so that its view field will cover the showcase 31, product 32, and a customer 30 (if any). The sensor device 100 takes pictures of these subjects and sends data of these pictures, together with depth data of each pixel and skeletal data of the customer 30, to the action recognition apparatus 200.

Figure 4:
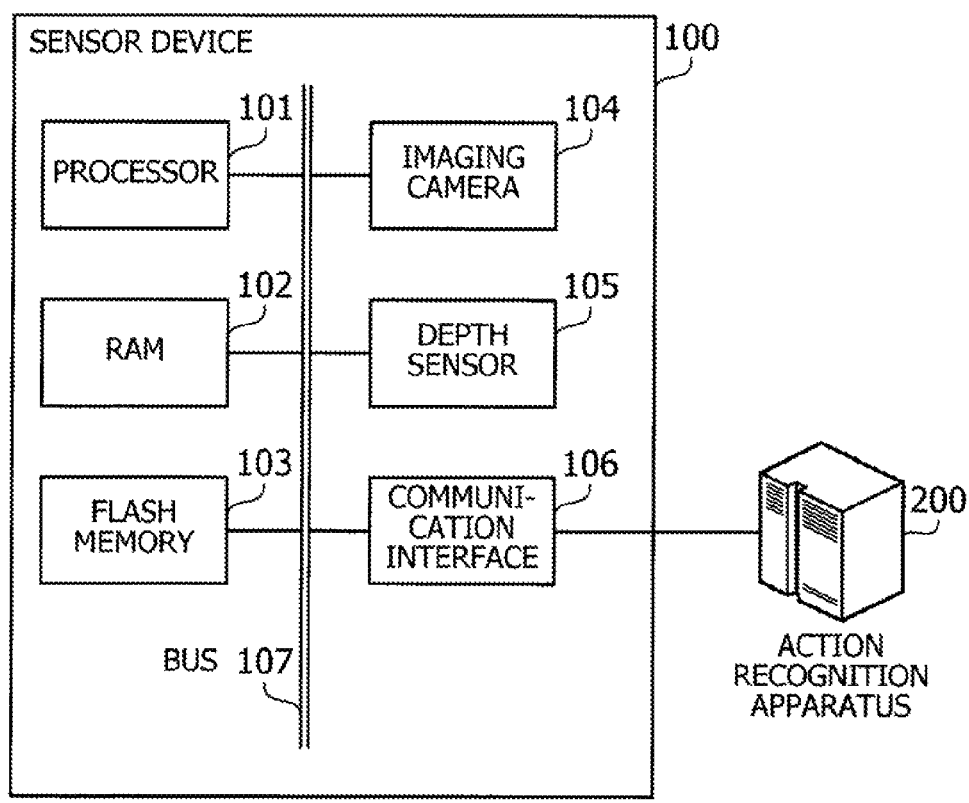
FIG. 4 is a block diagram illustrating an exemplary hardware configuration of a sensor device.

FIG. 4 is a block diagram illustrating an exemplary hardware configuration of a sensor device. The illustrated sensor device 100 includes a processor 101, a random access memory (RAM) 102, a flash memory 103, an imaging camera 104, a depth sensor 105, and a communication interface 106. All these components are connected to a bus 107 in the sensor device 100.

The processor 101 (e.g., central processing unit, or CPU) contains computation units to execute instructions encoded in software programs. The processor 101 reads at least part of program and data files stored in the flash memory 103 and executes programs after loading them on the RAM 102. A plurality of such processors may be integrated into a single processor 101. The sensor device 100 may include a plurality of processors or a plurality of processor cores to execute multiple programs in parallel. The term "processor" denotes a broad range of processing devices including field-programmable gate array (FPGA), application specific integrated circuit (ASIC), and other electronic circuits dedicated or programmed for specific purposes, as well as a combination of two or more such devices. The term "processor" may also refer to a combination of a general-purpose processor and such special-purpose devices.

The RAM 102 serves as a temporary memory for programs that the processor 101 executes, as well as for various data that the processor 101 refers to when executing programs. The sensor device 100 may have other kinds of volatile memory devices, without limitation in the number of such devices.

The flash memory 103 serves as a non-volatile storage device to store program and data files of firmware, applications, and other kinds of software. The sensor device 100 may have a plurality of non-volatile storage devices, including those of other types such as hard disk drive (HDD), in place of or together with the flash memory 103. Programs for the processor 101 may be copied from other storage devices to the flash memory 103.

The imaging camera 104 takes pictures and sends their data to the processor 101. The depth sensor 105 measures the depth of each pixel in the picture taken by the imaging camera 104 and sends measurement data to the processor 101. Various techniques are available to measure the depth of a remote object. Time of flight (TOF) method is one of those measurement techniques, which calculates the depth from round-trip time of laser light. As another such technique, the pattern projection method utilizes deformation of a pattern that reflected rays (e.g., infrared rays) make. To implement one of these methods, the depth sensor 105 is equipped with a light emitting device for laser or infrared rays and a light sensing device to receive reflection of the emitted light.

The communication interface 106 permits the processor 101 to communicate with other devices, such as the action recognition apparatus 200 as seen in FIG. 4.

An exemplary hardware configuration of the sensor device 100 has been described above. To name a more specific example, Kinect® sensor from Microsoft Corporation may be used as the sensor device 100.

Figure 5:
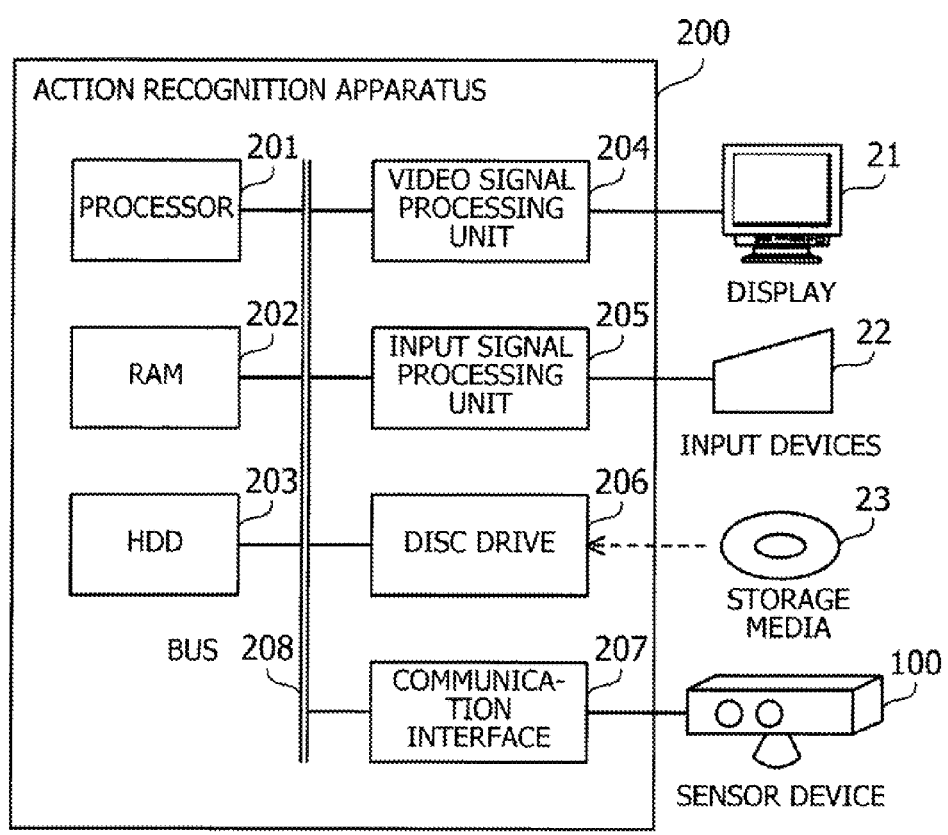
FIG. 5 is a block diagram illustrating an exemplary hardware configuration of an action recognition apparatus.

FIG. 5 is a block diagram illustrating an exemplary hardware configuration of an action recognition apparatus. The illustrated action recognition apparatus 200 includes a processor 201, a RAM 202, an HDD 203, a video signal processing unit 204, an input signal processing unit 205, a disc drive 206, and a communication interface 207. All these components are connected to a bus 208 in the action recognition apparatus 200.

The processor 201 contains computation units to execute instructions encoded in software programs, just as does the foregoing processor 101 in the sensor device 100. The RAM 202 is a volatile memory device serving as temporary storage for programs and data that the processor 201 executes or uses, just as does the foregoing RAM 102.

The HDD 203 works as a non-volatile storage device to store program and data files of the operating system (OS), firmware, applications, and other kinds of software. The action recognition apparatus 200 may have a plurality of non-volatile storage devices, including those of other types such as flash memory, in place of or together with the HDD 203.

The video signal processing unit 204 produces video images in accordance with commands from the processor 201 and displays them on a screen of a display 21 coupled to the action recognition apparatus 200. The display 21 may be, for example, a cathode ray tube (CRT) display or a liquid crystal display.

The input signal processing unit 205 receives input signals from input devices 22 attached to the action recognition apparatus 200 and supplies the received signals to the processor 201. The input devices 22 may be, for example, a keyboard and a pointing device such as mouse and touchscreen.

The disc drive 206 is a device used to read programs and data stored in storage media 23. The storage media 23 include, for example, magnetic disk media such as flexible disk (FD) and HDD, optical disc media such as compact disc (CD) and digital versatile disc (DVD), and magneto-optical storage media such as magneto-optical disc (MO). The disc drive 206 transfers programs and data read out of storage media 23 to, for example, the RAM 202 or HDD 203 according to commands from the processor 201.

The communication interface 207 permits the processor 201 to communicate with other devices, such as the sensor device 100 as seen in FIG. 5.

The above-described hardware configuration of the action recognition apparatus 200 may have some variations. For example, the disc drive 206 may be omitted from the action recognition apparatus 200. The video signal processing unit 204 and input signal processing unit 205 may also be omitted in the case where the action recognition apparatus 200 is not a stand-alone device, but wholly controlled by a remote terminal station. As yet another variation, the action recognition apparatus 200 may share its enclosure with the display 21 and input device 22.

Figure 6:
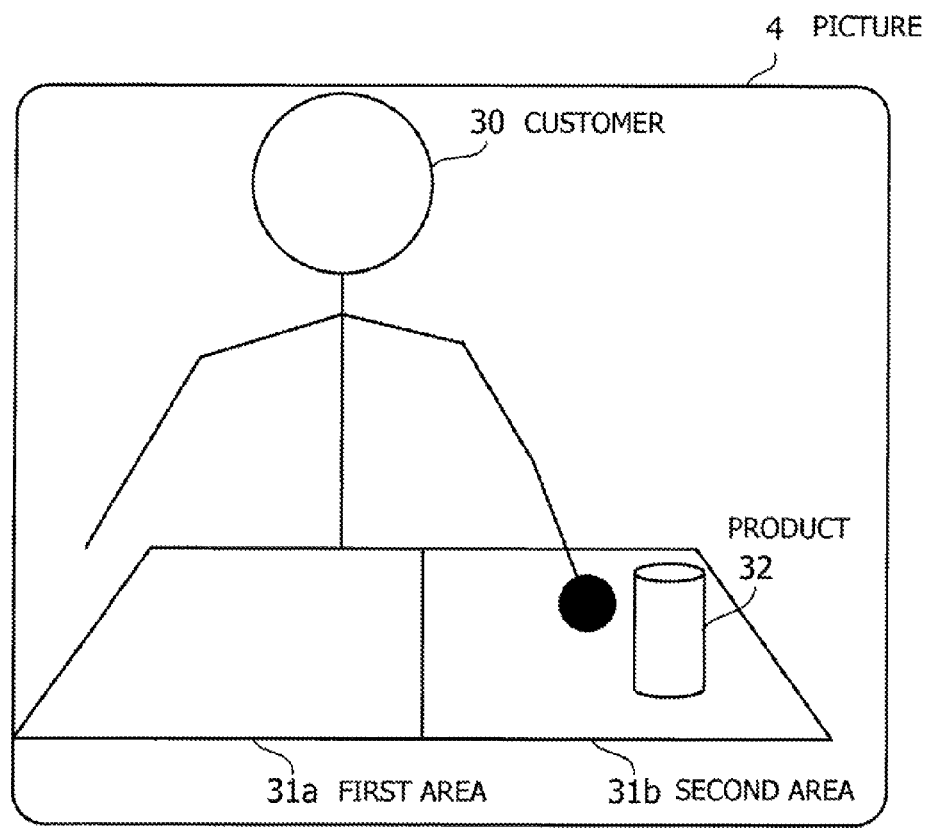
FIG. 6 illustrates a first exemplary picture in which an action is detected.
Figure 7:
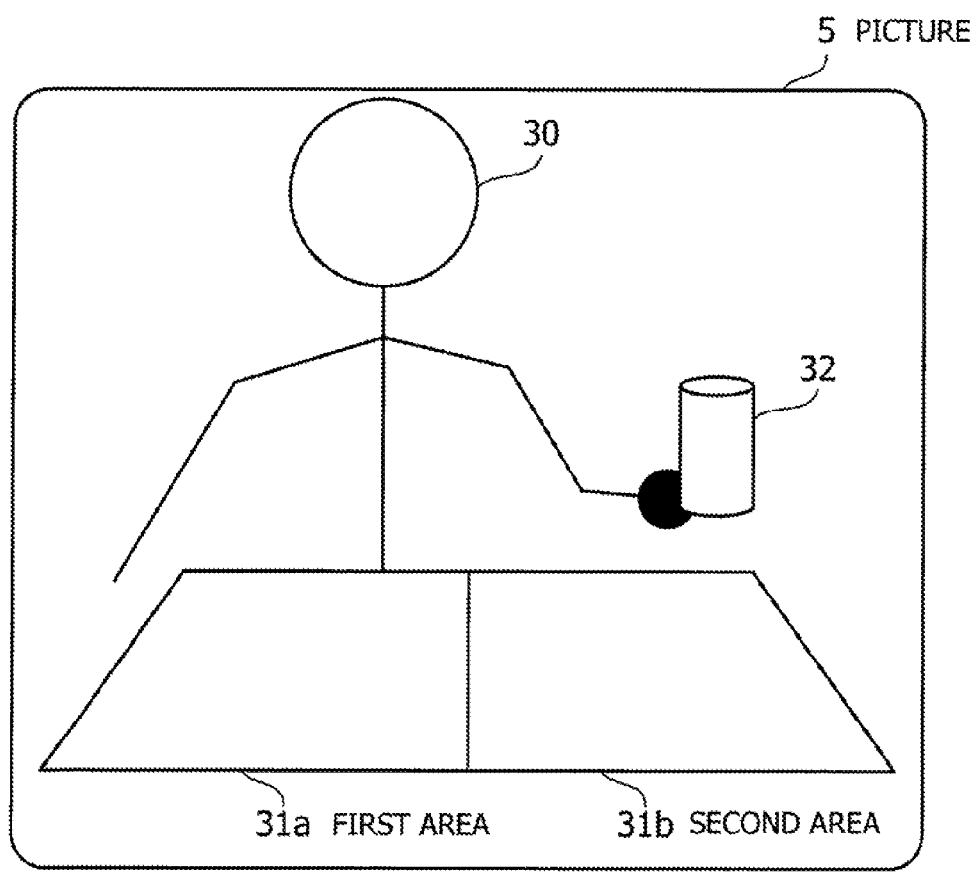
FIG. 7 illustrates a second exemplary picture in which a subsequent action is detected.
Figure 8:
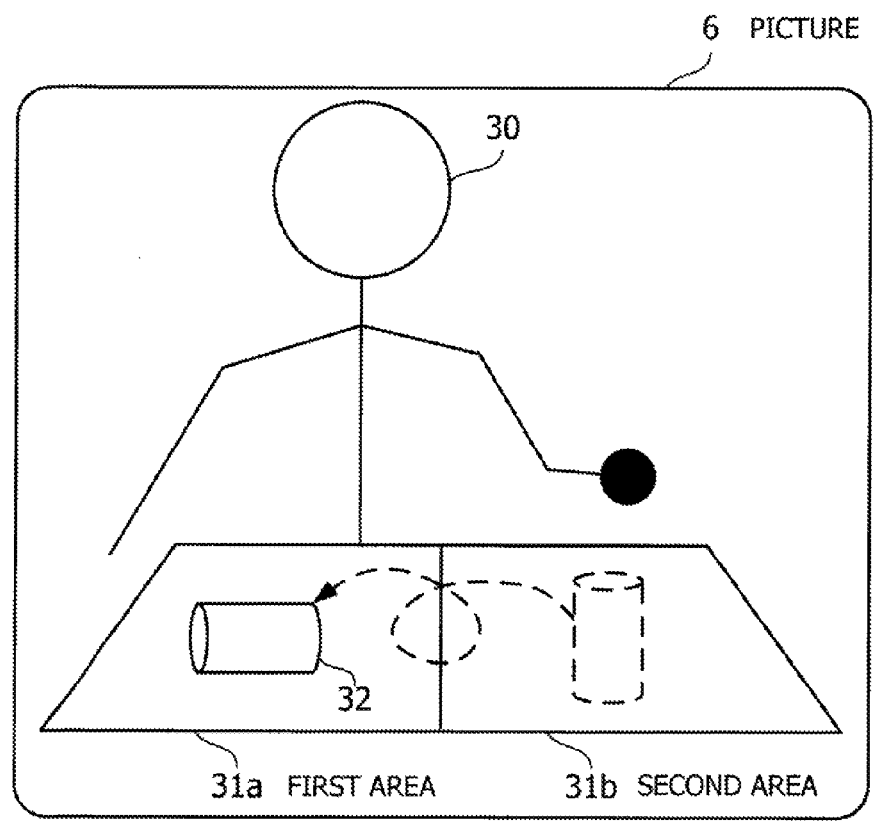
FIG. 8 illustrates a third exemplary picture in which another subsequent action is detected.

Referring next to FIGS. 6 to 8, the following description will present a comparative method for determining whether a customer has picked up a product, and discuss some drawbacks of the method. This is only for the purpose of comparison with the proposed method of the embodiments, but not intended to limit the embodiments. The comparative method starts with taking pictures with an imaging device. More specifically, one picture is taken when a hand has entered a predetermined area, and another picture is taken when the same hand has left the predetermined area. These pictures are compared by an action recognition apparatus to check the position of a product seen in the pictures. When a change is found in the position of the product, the action recognition apparatus determines that the customer seen in the pictures has picked up the product.

FIG. 6 illustrates a first exemplary picture in which an action is detected. Two areas are defined on the table top of a product showcase, which are referred to as first and second areas 31a and 31b as seen in FIG. 6. Different products may be placed in these two areas 31a and 31b. In the exemplary picture 4 of FIG. 6, however, one product 32 is seen in the second area 31b. The picture 4 is taken when a customer 30 has moved his or her left hand into the second area 31b. The action recognition apparatus receives data of this picture 4 from the imaging device.

FIG. 7 illustrates a second exemplary picture in which a subsequent action is detected. This picture 5 is taken by the imaging device after the action recognition apparatus has received the previous picture 4. More specifically, the new picture 5 depicts that the customer 30 has moved his or her left hand out of the second area 31b, with the product 32 in it. The action recognition apparatus receives data of this picture 5 from the imaging device.

The action recognition apparatus compares the two received pictures 4 and 5, thereby detecting that the product 32 is not present in the area 31b. With the absence of the product 32, the action recognition apparatus determines that the customer 30 has picked up the product 32.

FIG. 8 illustrates a third exemplary picture in which another subsequent action is detected. Illustrated is another possible picture 6 taken by the imaging device after the action recognition apparatus has received the previous picture 4. Specifically, the picture 6 depicts that the customer 30 has moved his or her left hand out of the second area 31b. Unlike the picture 5 discussed in FIG. 7, the product 32 is not in the hand of the customer 30, but has fallen and rolled on the table top into the first area 31a. This situation can happen if the product 32 is accidentally hit by some part of the body of the customer 30 or by a bag the customer 30 is carrying. The action recognition apparatus receives data of this picture 6 from the imaging device. The action recognition apparatus compares the two received pictures 4 and 6, thereby detecting absence of the product 32 in the area 31b. The action recognition apparatus mistakenly interprets this absence of the product 32 as indicating that the customer 30 has picked up the product 32.

The comparative method described above in FIGS. 6 to 8 relies on the difference between pictures. This method may, however, determine that a customer has picked up a product, although the fact is that his or her empty hand has moved out of a predetermined area. As this example demonstrates, the comparative method is susceptible to improvement in terms of accuracy of determination.

Figure 9:
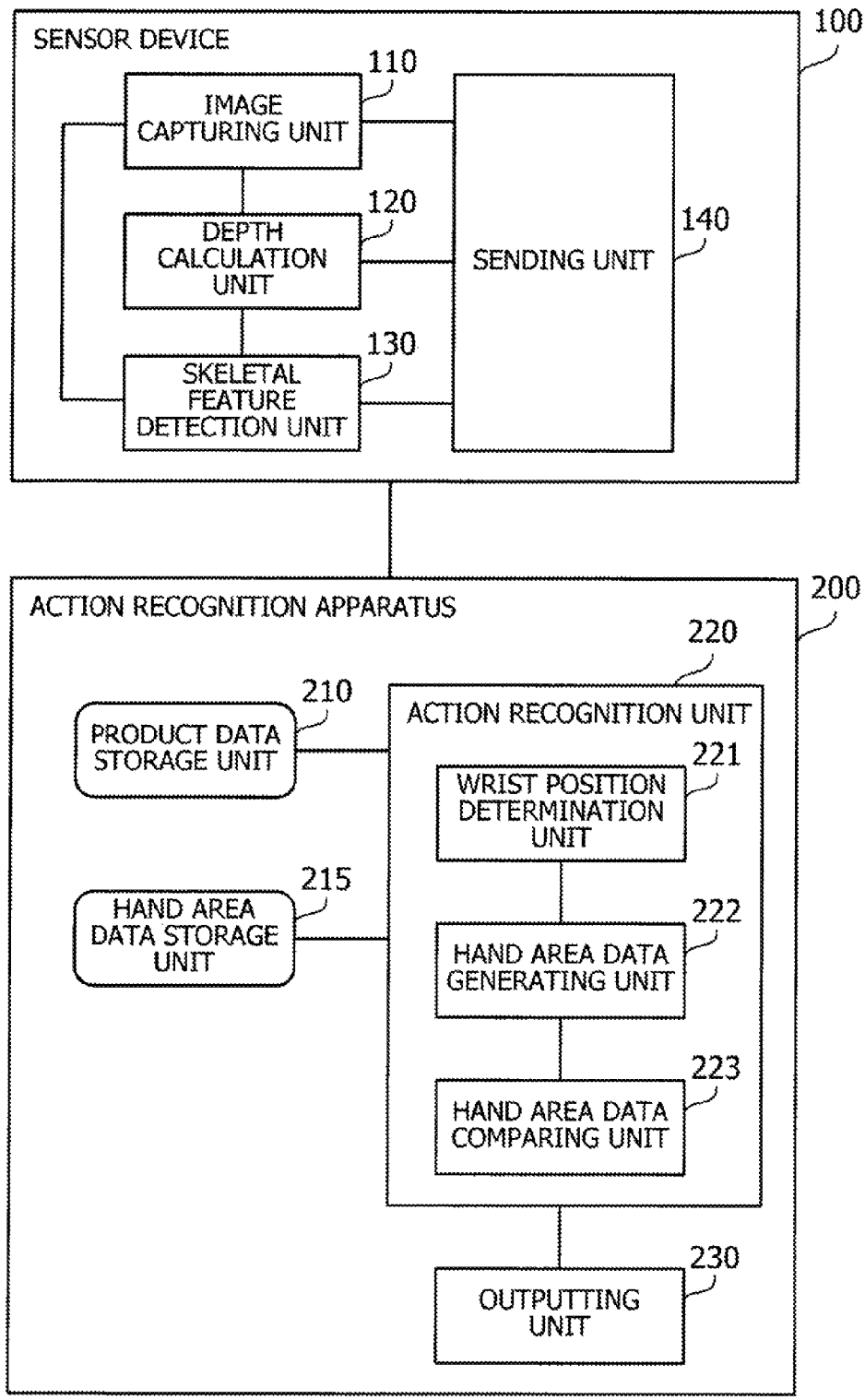
FIG. 9 is a block diagram illustrating exemplary functions of the sensor device and action recognition apparatus.

The proposed action recognition system 3 of the present embodiment is designed to reduce the chances of such misinterpretation of images. Referring now to FIG. 9 and subsequent drawings, the following section describes a method that the action recognition system 3 executes to recognize a customer picking up a product.

FIG. 9 is a block diagram illustrating exemplary functions of the sensor device and action recognition apparatus. Referring first to the upper half of FIG. 9, the illustrated sensor device 100 includes an image capturing unit 110, a depth calculation unit 120, a skeletal feature detection unit 130, and a sending unit 140. See also FIG. 4 for other components in the sensor device 100.

The image capturing unit 110 obtains picture data from an imaging camera 104 at predetermined intervals.

The depth calculation unit 120 calculates depth of each pixel in the captured picture on the basis of measurement data of a depth sensor 105. Each time the image capturing unit 110 obtains new picture data, the depth calculation unit 120 repeats this depth calculation and produces depth data indicating the depth of pixels.

The skeletal feature detection unit 130 analyzes picture data and depth data to detect the skeletal positions of previously specified parts (e.g., wrists, elbows, head, and shoulders) of a person seen in the picture. Each time the image capturing unit 110 obtains new picture data, the skeletal feature detection unit 130 detects the skeletal positions of body parts and outputs skeletal data including position data indicating each skeletal part of interest. The position data of a body part includes its coordinates in the picture and its distance (depth) from the sensor device 100. When the picture contains images of two or more persons, the skeletal feature detection unit 130 may produce skeletal data for each individual person.

The sending unit 140 sends the action recognition apparatus 200 the data of pictures taken and their depth data, as well as skeletal data if any person's image is included in the pictures.

The above image capturing unit 110, depth calculation unit 120, skeletal feature detection unit 130, and sending unit 140 may be implemented as part of the functions that the processor 101 offers by executing programs.

Referring to the lower half of FIG. 9, the illustrated action recognition apparatus 200 include a product data storage unit 210, a hand area data storage unit 215, an action recognition unit 220, and an outputting unit 230.

The product data storage unit 210 is where a product data table is stored. This product data table is a collection of information about products sold at a retail shop in which the action recognition system 3 is deployed. The product data storage unit 210 may be implemented as, for example, a non-volatile storage space secured in the HDD 203 or the like.

The hand area data storage unit 215 stores a hand area data table, which is a collection of information about hands of a customer. A hand area is defined around the position of a person's wrist. More specifically, a hand area is a collection of pixels that are extracted from a specified area surrounding the wrist coordinate as having depths in a specific depth range. The pixels in a hand area include those with a distinctive color tone (e.g., pale orange). The hand area data table stored in the hand area data storage unit 215 indicates, among other things, the number of those distinctive color pixels and the number of other pixels than the distinctive color pixels, as will be discussed in detail later. The hand area data table is produced for temporary use when the action recognition unit 220 performs its tasks. The hand area data storage unit 215 may be implemented as, for example, a storage space secured in the RAM 202.

The action recognition unit 220 determines whether the customer has picked up a product, on basis of information received from the sensor device 100. To achieve this, the action recognition unit 220 includes a wrist position determination unit 221, a hand area data generating unit 222, and a hand area data comparing unit 223.

The wrist position determination unit 221 analyzes given pictures to determine whether the customer's wrist has entered or has left a particular area where a product is placed, based on the picture data and skeletal data received from the sensor device 100.

The hand area data generating unit 222 produces hand area data from image data, depth data, and skeletal data at the moment when the customer's wrist enters the product area. The hand area data generating unit 222 does the same when the customer's wrist goes out of the product area. These pieces of hand area data are recorded in a hand area data table.

The hand area data comparing unit 223 compares two records of hand area data with each other, one at the time of entry to the product area and the other at the time of exit from the product area. Based on the result of this comparison, the hand area data comparing unit 223 determines whether the customer has picked up the product in the area.

The outputting unit 230 outputs information about a product when the hand area data comparing unit 223 determines that the customer has picked up that product.

The above wrist position determination unit 221, hand area data generating unit 222, hand area data comparing unit 223, and outputting unit 230 may be implemented as part of the functions that the processor 201 offers by executing programs.

Figure 10:
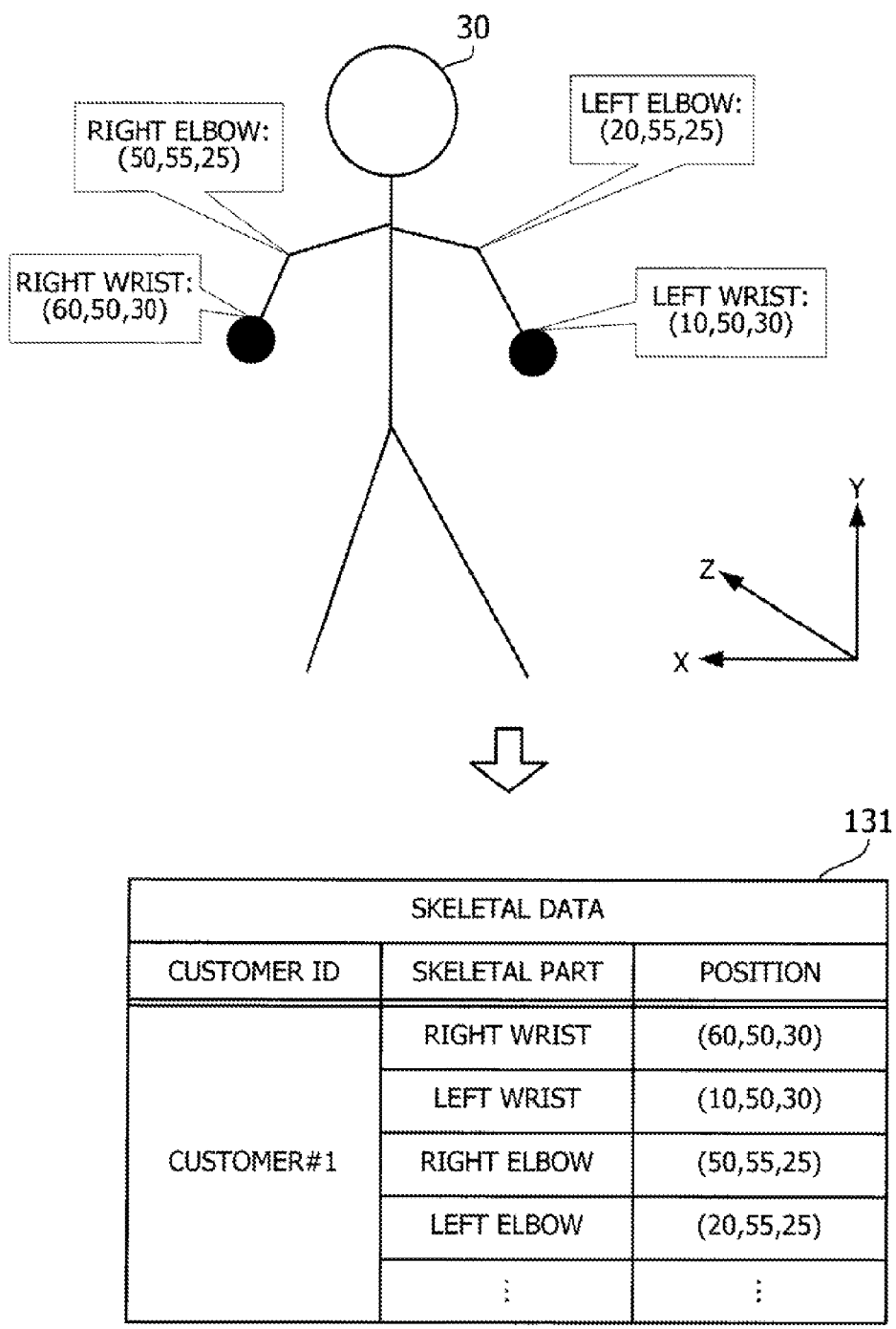
FIG. 10 illustrates an example of skeletal data.

Referring to FIGS. 10 to 12, the following section describes what information and tables are used in the action recognition system 3.

FIG. 10 illustrates an example of skeletal data. Skeletal data 131 is produced by the skeletal feature detection unit 130 to offer the positions of several skeletal portions, such as elbows and wrists, of a customer. Specifically, the skeletal data 131 is formed from the following data fields: Customer Identifier (ID), Skeletal Part, and Position.

The customer ID field contains an identifier that distinguishes each particular customer seen in pictures. The skeletal part field contains the distinguishing name of each specified part of the customer's body. The position field indicates the position of each specified part of the customer's body, which is represented as the coordinates (X, Y, Z) with respect to the optical axis of the imaging camera 104 in the action recognition system 3. X axis is a horizontal axis running perpendicular to the optical axis, whose leftward direction is positive when viewed from the imaging camera 104. Y axis is a vertical axis running perpendicular to the optical axis, whose upward direction is positive when viewed from the imaging camera 104. Z axis runs on the optical axis in the direction away from the imaging camera 104. X-Y coordinates represent each point of skeletal parts seen in a picture, while Z coordinates represent the depth of such points.

Referring to the example of FIG. 10, the right wrist, left wrist, right elbow, left elbow, and other things of a customer are detected as his or her skeletal parts. For example, the right wrist of a customer 30 is detected at a coordinate point of (60, 50) with a depth of 30. This right wrist position is recorded as a value of (60, 50, 30) in the position field of the skeletal data 131. The skeletal position may alternatively be represented in the form of latitude, longitude, and height.

FIG. 11 illustrates an example of a product data table. The illustrated product data table 211 is stored in the product data storage unit 210 to define in-picture areas corresponding to actual display locations of products in the retail shop. These in-picture areas are monitored to detect entry or exit of a customer's wrist. Specifically, the illustrated product data table 211 is formed from Product ID and Area Data fields.

The product ID field contains an identifier that distinguishes each product from others. The area data field contains position data that defines an in-picture area in which a product is placed. This area is referred to as a "product area."

The proposed action recognition system 3 assumes that the product areas are quadrangular in shape. The position data of a quadrangular product area is thus a set of four corner coordinates, each in the form of (X, Y) to indicate the X axis position and Y axis position of a corner point. The product ID and its corresponding area data may be user-defined.

Product areas may be in other shapes, such as circular or oval, although the ones defined in FIG. 11 are quadrangular. In the case of rectangular product areas, the area data may only specify the coordinates of upper-right and lower-left corners. It is also noted that the product data table 211 may contain more data fields, such as product names and the number of times that the product was picked up.

FIG. 12 illustrates an example of a hand area data table. The illustrated hand area data table 215a is temporarily stored in the hand area data storage unit 215 to record information about hand areas of customers. Specifically, the hand area data table 215a is formed from the following data fields: Hand Area ID, State, Distinctive Color Pixel Count, and Indistinctive Color Pixel Count.

The hand area ID field contains an identifier that distinguishes a hand area from others. Each registered hand area corresponds to a customer's wrist that has entered or left a product area. As will be described later, a hand area is a set of pixels whose depths fall within a specified range around the wrist in the picture. These pixels are extracted from a surrounding area of the wrist.

The state field indicates a recorded state of the wrist. More specifically, the state field contains either a value of "IN" to indicate that the wrist has entered a product area, or a value of "OUT" to indicate that the wrist has left a product area.

The distinctive color pixel count field indicates the number of hand-area pixels having a distinctive color tone. The description refers to such pixels as "distinctive color pixels," and their quantity as "distinctive color pixel count."

The indistinctive color pixel count field indicates the number of hand-area pixels whose color code does not fall in the range of distinctive color tone. The description refers to such pixels as "indistinctive color pixels," and their quantity as "indistinctive color pixel count."

The discrimination between a distinctive color pixel and an indistinctive color pixel is made by testing whether the color code of the pixel in question falls within a range demarcated by thresholds. The color code of pixels is expressed with a specific color model, such as Red Green Blue (RGB) model and Cyan Magenta Yellow (CMY) model. The color code may also be expressed as chrominance, or color-difference components.

As mentioned above, the distinctive color tone is specified as one or more definite color ranges demarcated by thresholds. A pixel will be determined to have a distinctive color tone when its color code falls within one of those color ranges. For example, the action recognition system 3 is configured to extract pale orange pixels as distinctive color pixels. The selection of a distinctive color tone, however, is not limited by this specific example.

Figure 14:
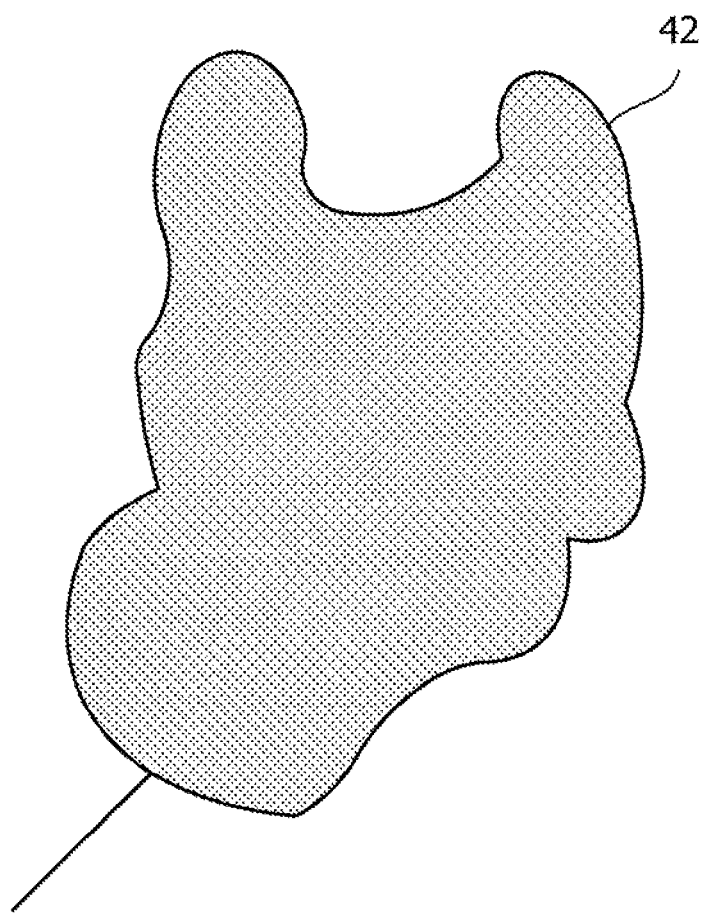
FIG. 14 illustrates a hand area image of a customer in the case where no products are held in his or her hand.
Figure 15:
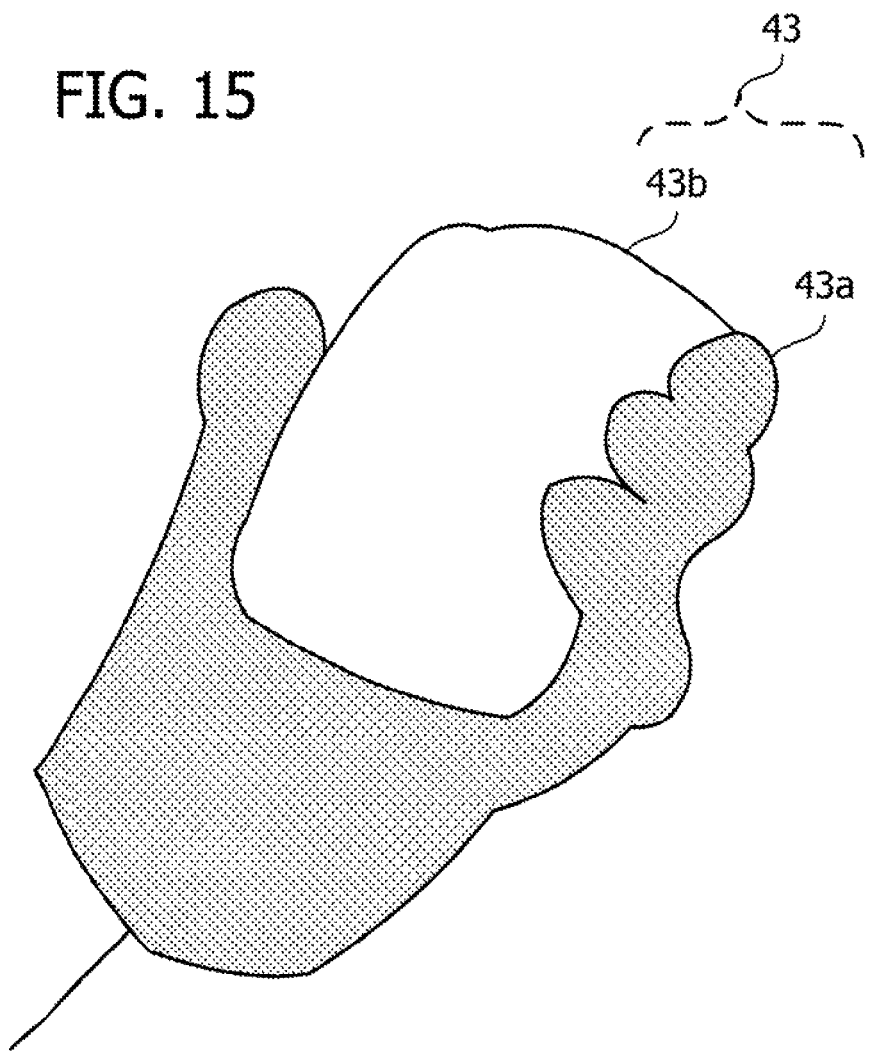
FIG. 15 illustrates another hand area image of the same customer when a product is held in his or her hand.

Referring now to FIGS. 13 to 15, the following description will explain in detail how the proposed method determines whether a product is picked up. It is assumed in FIGS. 13 to 15 that a customer 30 has moved his or her left wrist 41a out of a product area.

FIG. 13 illustrates an example of extraction of a hand area. Specifically, the picture seen in FIG. 13 includes a product area 31b with a quadrangular shape, which has been registered in the product data table 211. The wrist position determination unit 221 observes product areas, such as the illustrated product area 31b in FIG. 13, to detect a human wrist when it appears in those areas. The position of a wrist, if any, in the picture is indicated in the form of X and Y coordinates, as part of position data included in the skeletal data. The wrist position determination unit 221 keeps track of the wrist position, thus detecting its entry into a product area and its exit from the same.

Upon detection of entry of a customer's wrist into a specific product area, as well as upon detection of its exit from that area, the hand area data generating unit 222 extracts a hand area by executing a procedure described below. What are seen in the exemplary picture of FIG. 13 are a customer 30 and his or her left wrist 41a and left elbow 41b. The following procedure is to extract a hand area corresponding to the left wrist 41a.

The hand area data generating unit 222 cuts out an image area 41 surrounding the left wrist 41a from the given picture as seen in the upper half of FIG. 13. This surrounding area 41 has a rectangular shape with a predetermined size. Based on the position of the left wrist 41a and its corresponding left elbow 41b in the picture, the hand area data generating unit 222 calculates a point at which the center of the surrounding area 41 will be placed so as to contain the entire left hand of the customer 30. Referring to the example seen in the upper half of FIG. 13, the center point 41c of the surrounding area 41 is located on the straight line running from left elbow 41b to left wrist 41a, with a certain amount of offset beyond the left wrist 41a.

The action recognition unit 220 may alternatively be configured to calculate a center point 41c on the basis of the customer's wrist and hand positions. The action recognition unit 220 may also be configured to vary the size of the surrounding area 41 depending on the distance between the left wrist 41a and the left elbow 41b.

The hand area data generating unit 222 calculates a depth range for demarcating a hand area within the surrounding area 41, based on the depth of the left wrist 41a. This range of depth may be referred to as a "hand depth range." For example, the hand area data generating unit 222 calculates a hand depth range of $(\alpha-\beta)$ to $(\alpha+\beta)$, where the symbol $\alpha$ denotes the wrist depth.

The hand area data generating unit 222 then extracts a hand area from the surrounding area 41 by removing pixels whose depths are not in the calculated hand depth range. Referring to the example seen in the upper half of FIG. 13, the surrounding area 41 is formed from a foreground area 41e representing a hand and a background area 41d representing its background. The foreground area 41e can be distinguished as having depths within the hand depth range calculated on the basis of a left wrist 41a unlike the background area 41d. The hand area data generating unit 222 thus removes pixels whose depths are not in the hand depth range. The remaining pixels in the surrounding area 41 form a hand area as illustrated in the lower half of FIG. 13.

FIG. 14 illustrates a hand-area image of the customer in the case where no products are held in his or her hand. FIG. 15 illustrates another hand area image of the customer when a product is held in his or her hand. It is assumed in both FIGS. 14 and 15 that a hand area has been extracted from a picture taken at the time of exit of the customer's wrist from a product area, and that the entire hand area is filled with distinctive color pixels. It is also assumed in both FIGS. 14 and 15 that the action recognition apparatus 200 is configured to recognize that a customer has picked up a product if the ratio of distinctive color pixels in a hand area is decreased by 20% or more at the time of exit from a product area, relative to the ratio at the time of entry into the same.

Here the customer 30 moves his or her left wrist 41a out of the product area 31b with nothing in his or her hand, and a picture is taken at the time of that movement. Illustrated in FIG. 14 is a hand area 42 extracted from the picture, which is entirely made up of distinctive color pixels. In other words, the ratio of distinctive color pixels in the hand area 42 is 100%. This means that there has been no change in the distinctive color pixel ratio since the entry of the wrist into the product area 31b. With the change being less than 20%, the action recognition apparatus 200 concludes that the customer 30 has no product in his or her hands.

In contrast to FIG. 14, the hand area 43 seen in FIG. 15 has been extracted from the picture taken upon movement of the customer 30's left wrist 41a out of the product area 31b with a product held in his or her hand. The image of this hand area 43 includes a first area 43a of distinctive color pixels and a second area 43b of indistinctive color pixels. Suppose, for example, the first area 43a contains as many pixels as the second area 43b. The ratio of distinctive color pixels in the hand area 43 is 50% in this case, which means a change exceeding 20% with respect to the ratio (100%) at the time of entry to the product area 31b. Accordingly, the action recognition apparatus 200 recognizes that the customer 30 holds a product in his or her hand.

As can be seen from the above explanation of FIGS. 13 to 15, the hand area data generating unit 222 extracts a hand area as a set of pixels whose respective depths fall within a specific depth range including the position of a customer's wrist, upon its entry to or exit from a product area. The hand area data generating unit 222 determines whether the customer has picked up a product, on the basis of a difference in the ratio of distinctive color pixels between the hand area at the time of entry into the product area and that at the time of exit from the same.

It may be an option for the hand area data generating unit 222 to determine whether a customer has picked up a product, on the basis of the number of distinctive color pixels in each hand area extracted at the time of entry into a product area and exit from the product area. This option, however, has a drawback in the accuracy of determination since the number of distinctive color pixels is affected by wrist angle variations at the moment of entry to and exit from a product area. The hand area data generating unit 222 is therefore designed to use, not the number, but the ratio of distinctive color pixels so as to avoid disturbance by such wrist angle variations.

It may be another option for the hand area data generating unit 222 to determine whether a customer has picked up a product, based on only one hand area extracted upon exit of his or her wrist from a product area. When this is the case, the hand area data generating unit 222 detects a product held in the customer's hand if, for example, the hand area contains distinctive color pixels whose share is less than a predetermined threshold. However, the image in a hand area could be misinterpreted when the hand area keeps a certain percentage of indistinctive color pixels, as in the case where the customer wears a long-sleeve shirt, for example. This is why the hand area data generating unit 222 is configured to compare two hand-area images extracted upon entry to a product area and upon exit from that product area. The proposed hand area data generating unit 222 thus makes accurate determination even when the hand area keeps a certain percentage of indistinctive color pixels.

Figure 16:
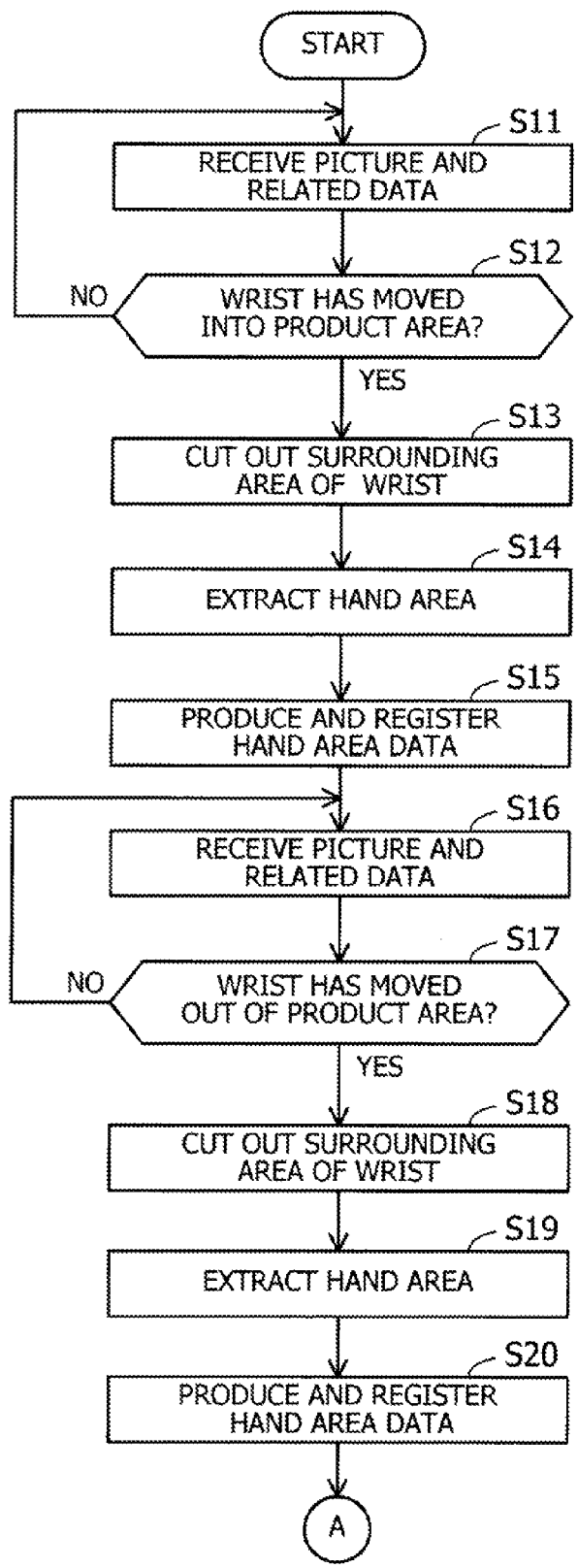
FIGS. 16 and 17 are a flowchart illustrating an example of how to recognize a customer holding a product.
Figure 17:
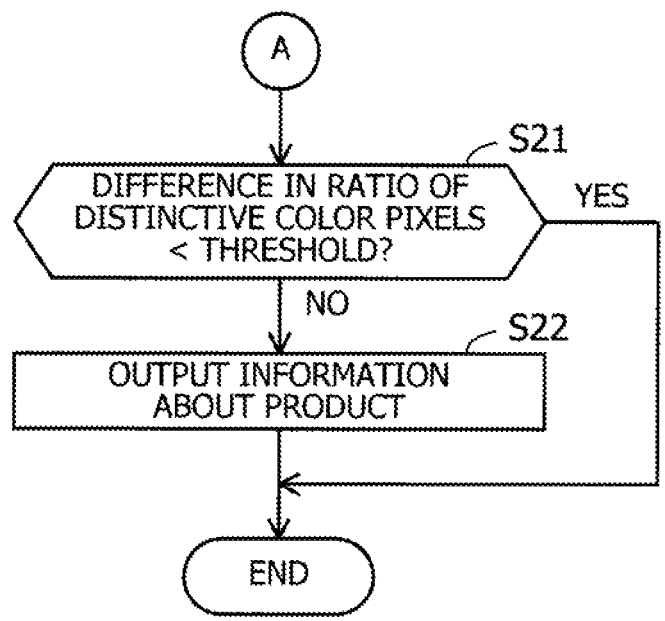

FIGS. 16 and 17 are a flowchart illustrating an example of how to recognize that a customer has picked up a product. It is assumed that the customer's wrists are located outside the product area of interest when the process illustrated in FIGS. 16 and 17 is triggered. Each operation seen in FIGS. 16 and 17 will be described below in the order of step numbers.

(S11) The wrist position determination unit 221 receives a picture and depth data from the sensor device 100. The wrist position determination unit 221 also receives skeletal data of a customer seen in the picture.

(S12) The wrist position determination unit 221 determines whether the customer's wrist has moved into a product area. The position of a wrist seen in the picture is obtained from the position field of the received skeletal data, which describes the right or left wrist. Information about product areas is available in the area data field of the foregoing product data table 211. More specifically, the wrist position determination unit 221 determines whether the wrist position indicated by the received skeletal data has moved into one of the product areas registered in the product data table 211.

When the wrist position is found to be in a product area, the process advances to step S13. When the wrist position is still out of the product areas, the process returns to step S11. In other words, the wrist position determination unit 221 repeats steps S11 and S12 until it receives a picture in which the customer's wrist is found in one of the product areas.

(S13) The hand area data generating unit 222 cuts out a surrounding area of the wrist from the received picture. That is, the customer's wrist is now in the product area. Based on the positions of the wrist and its corresponding elbow in the picture, the hand area data generating unit 222 calculates an image area surrounding the wrist as explained previously in the upper half of FIG. 13.

To obtain the wrist and elbow positions for the above action, the hand area data generating unit 222 searches skeletal data for relevant records. That is, the wrist position is obtained from a skeletal data record that contains a value indicating the wrist seen in the product area. Similarly the elbow position is obtained from a skeletal data record that contains a value indicating the elbow corresponding to the wrist in question.

(S14) The surrounding area obtained at step S13 contains an image of the customer's hand. The hand area data generating unit 222 extracts a hand area as a set of pixels whose respective depths are within a specified depth range including the position of the wrist. The depth range is defined on the Z axis, around the depth of the wrist, as explained previously in FIG. 13.

(S15) The hand area data generating unit 222 counts distinctive color pixels and indistinctive color pixels in the extracted hand area. The determination of whether pixels have a distinctive color tone is made by comparing their color codes with several thresholds previously defined therefor.

The hand area data generating unit 222 then produces a record of hand area data by populating its hand area ID field, state field, distinctive color pixel count field, and indistinctive color pixel count field. Specifically, the hand area ID field is given a specific identifier of a hand area. The state field is given a value of "IN" to indicate entry to a product area. The distinctive color pixel count field is populated with the number of distinctive color pixels counted above, as is the indistinctive color pixel count field with the number of indistinctive color pixels. The hand area data generating unit 222 registers the produced record of hand area data in the hand area data table 215a.

(S16) The wrist position determination unit 221 receives another picture and its depth data from the sensor device 100. The wrist position determination unit 221 also receives new skeletal data of the customer seen in the picture.

(S17) The wrist position determination unit 221 analyzes the received picture and determines whether the customer's wrist has moved out of the product area. The wrist and elbow positions are obtained in the same way as discussed above for step S12.

When the wrist position is found to be out of the product area, the process advances to step S18. When the wrist position is still in the product area, the process returns to step S16. In other words, the wrist position determination unit 221 repeats steps S16 and S17 until it receives a picture in which the customer's wrist is out of the product area.

(S18) The hand area data generating unit 222 cuts out an image area surrounding the wrist from the received picture in the same way as discussed above for step S13.

(S19) Based on the depth of each pixel in the surrounding area, as well as the depth of the of the wrist in question, the hand area data generating unit 222 extracts a hand area in the same way as discussed above for step S14.

(S20) The hand area data generating unit 222 counts distinctive color pixels and indistinctive color pixels in the extracted hand area, in the same way as discussed above for step S15.

The hand area data generating unit 222 then produces a record of hand area data. This record has the same hand area ID as the one produced at step S15 and contains a value of "OUT" in the state field. The distinctive color pixel count field is populated with the number of distinctive color pixels counted above, as is the indistinctive color pixel count field with the number of indistinctive color pixels. The hand area data generating unit 222 registers the produced record of hand area data in the hand area data table 215a.

FIG. 17 is a second part of the flowchart discussed above for an example of how to recognize that a customer is holding a product.

(S21) The hand area data comparing unit 223 calculates the ratio of distinctive color pixels in the previous hand area registered at step S15 to the total number of pixels contained in the same. The hand area data comparing unit 223 also calculates the ratio of distinctive color pixels in the current hand area of step S20 to the total number of pixels contained in the same. That is, the ratio of distinctive color pixels in each hand area is calculated as a quotient of the number of distinctive color pixels divided by the total number of distinctive color pixels and indistinctive color pixels.

The hand area data comparing unit 223 further calculates a difference between the above two ratios and determines whether the difference is smaller than a predetermined threshold. If the difference is smaller than the threshold, it suggests that the customer seen in the picture has nothing in his or her hands. The hand area data comparing unit 223 thus closes the current process. If the difference is equal to or greater than the threshold, it suggests that the customer seen in the picture has picked up a product. The hand area data comparing unit 223 thus advances the process to step S22.

(S22) The outputting unit 230 outputs information about the product that the customer has picked up. The product is identified by searching the product data table 211 for a record associated with the product area that the customer's wrist entered and then left. The outputting unit 230 updates a log file by adding, for example, the identifier of the product picked up by the customer, together with a timestamp indicating that moment. Alternatively, the outputting unit 230 may output such product information on a screen of the display 21. The outputting unit 230 may also output status information indicating the customer's behavior (e.g., compared products or checked information about a particular product).

According to the second embodiment described above, the proposed action recognition system 3 extracts a hand area from each of the pictures taken upon entry of a customer's wrist into a product area and upon exit from the same. The action recognition system 3 then determines whether the customer has picked up a product, based on the ratio of pixels having a distinctive color tone to all pixels in each extracted hand area. The proposed techniques contribute to a better accuracy of determination of such a product-grasping action by a customer.

Specifically, the action recognition system 3 analyzes the depth of each pixel in an image area surrounding a customer's wrist and calculates a depth range based on the depth of the wrist. A hand area is then extracted as a set of pixels whose depths fall in the calculated depth range. The action recognition system 3 further classifies pixels in the extracted hand area into distinctive color pixels and indistinctive color pixels. These features of the second embodiment improve the accuracy of hand area extraction, thus contributing to more accurate determination of whether the customer has picked up a product. While the proposed method includes the task of classifying pixels into two groups, the load of this task is not significant because the task is performed only in a limited hand area. This smallness of hand areas also means an increase in the relative share of distinctive color pixels in a hand area, which further contributes to more accurate determination of a product-grasping action by a customer.

The proposed method relies on the ratio of pixels having a distinctive color tone. This feature makes it possible to recognize a product-grasping action by a customer, regardless of variations in the angle of his or her wrist as it enters or leaves a product area.

The proposed method uses at least two hand area images, one produced upon entry of a customer's wrist into a product area and the other produced upon exit of the same from the product area. The use of these images makes it possible to recognize a product-grasping action accurately even when the indistinctive color pixels occupy a certain percentage of the hand area.

The proposed method further uses the in-picture position of an elbow of a customer, together with that of a wrist, in determining the boundaries of an image area surrounding the wrist. While the wrist angle may vary, and hands may open or close at the customer's will, the noted feature prevents the hand from failing to fit in the surrounding area, thus contributing to more accurate determination of a product-grasping action by a customer.

Whether particular products have been picked up by customers is important information for the shop operator, because picking up a product implies that the customer has felt a certain degree of interest in the product. In other words, it suggests that the customer at least thought of buying the product even though he or she actually did not purchase it. The information helps the shop operator analyze the correlation between such behavior of customers and actual purchase of products, so that the shop operator may be inspired to improve the products per se or the layout of product showcases.

(c) Third Embodiment

This section describes an action recognition system according to a third embodiment. The proposed action recognition system of the third embodiment may be regarded as a modified version of the action recognition system 3 discussed above in the second embodiment. Specifically, the third embodiment is configured to determine the thresholds demarcating a range(s) of distinctive color tone, on the basis of color codes of pixels contained in a hand area. The pixels in the hand area are then classified according to the determined thresholds.

The above features of the third embodiment are expected to work effectively when, for example, the customer wears a pair of globes with a color other than skin colors. If the thresholds are fixed for a particular skin color, then the distinctive color pixel count would be zero in this case, in spite of the fact that the customer's hand is there. The incorrect pixel count would result in a failed determination of whether the customer has picked up a product.

Figure 18:
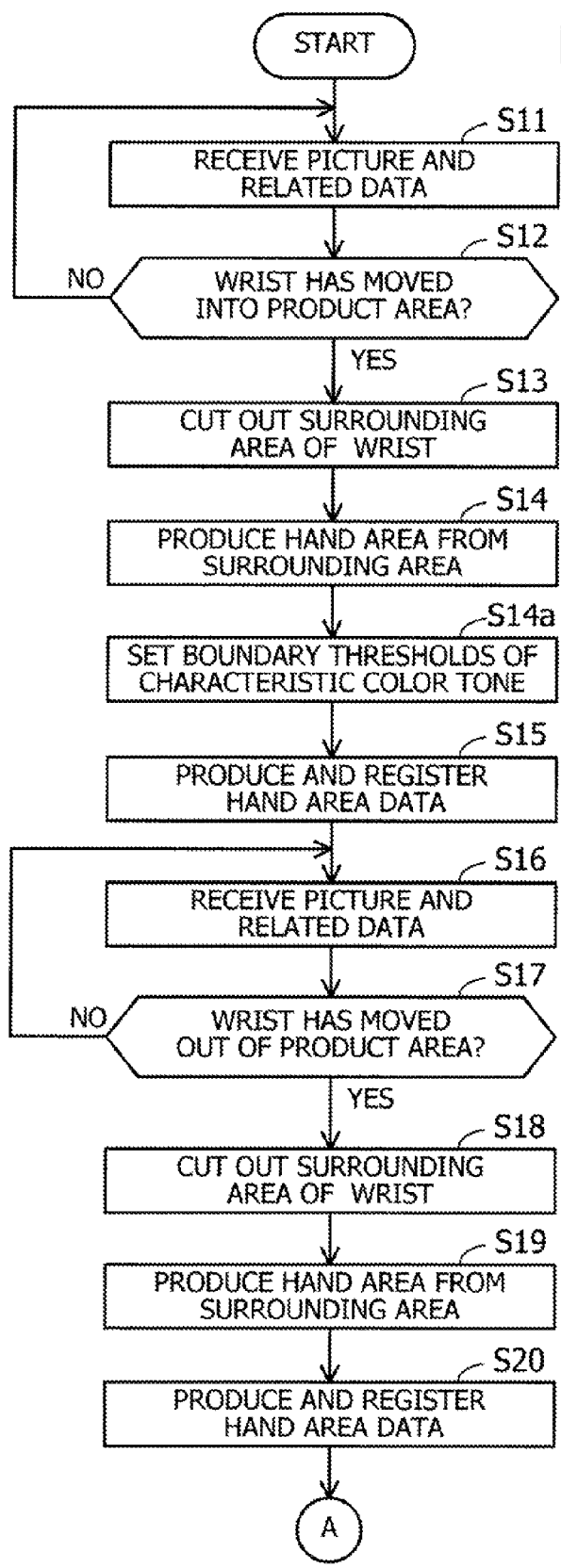
FIG. 18 is a flowchart illustrating an exemplary process according to a third embodiment to recognize a customer holding a product.

In view of the above issues, the flowchart of FIG. 18 provides an example of how the action recognition system selects more appropriate thresholds on the basis of color code of pixels contained in a hand area each time the wrist position moves into a product area. Since most part of the flowchart of FIG. 18 is similar to the one discussed in the second embodiment, the following description will focus on its difference. See the previous explanation of FIG. 16 in the second embodiment for other features and steps.

FIG. 18 is a flowchart illustrating an exemplary process according to the third embodiment to recognize a customer holding a product. This flowchart differs from that of the second embodiment in its additional step S14a inserted between step S14 and step S15. The flowchart of FIG. 18 assumes that the color code of each pixel is expressed in the RGB format. Step S14a in FIG. 18 performs the following things.

(S14a) The hand area data generating unit 222 selects thresholds for demarcating a range of distinctive color tone, on the basis of color code of pixels contained in the hand area extracted from the picture.

For example, hand area data generating unit 222 calculates an average of pixels in the hand area, for each individual color component (e.g., R, G, B) constituting the color code. The hand area data generating unit 222 then determines the thresholds in reference to the calculated average, so as to establish a certain range of color code for each color component. The hand area data generating unit 222 then applies the calculated thresholds of each color component to steps S15 and S20 of classifying pixels in a hand area into distinctive color pixels and indistinctive color pixels.

The calculation of thresholds may be based on statistical data on the color codes of pixels in a hand area, although the above example uses average color components.

According to the third embodiment described above, the proposed action recognition system selects appropriate color thresholds on the basis of color code of pixels contained in a hand area, each time the wrist position moves into a product area. The selected color thresholds are used to distinguish distinctive color pixels. These features of the third embodiment ensure accurate determination of whether a product has been picked up, regardless of what skin color the customers have or what they are wearing on their hands.

As discussed previously, the data processing operations of the first embodiment are implemented as part of functions of an information processing apparatus 2 executing programs encoded therefor. Similarly those of the second embodiment and third embodiment are implemented as part of functions of a sensor device 100 and an action recognition apparatus 200 executing programs encoded therefor. Such programs may be recorded on a non-transitory computer-readable medium (e.g., storage media 23 in FIG. 5). The computer-readable medium may be, for example, a magnetic storage device, optical disc, magneto-optical storage medium, or semiconductor memory device. Magnetic disk media include, for example, FD and HDD. Optical disc media include CD, CD Recordable (CD-R), CD Rewritable (CD-RW), DVD, DVD-R, and DVD-RW.

Portable storage media may be used for distribution of programs. For example, a computer stores programs in its local storage device (e.g., HDD 203), which have previously been installed from a portable storage medium or received from another computer. The computer executes programs read out of the local storage device. Where appropriate, the computer may execute program code read out of a portable storage medium, without installing them in its local storage device. It is also noted that the above-described data processing functions may be implemented wholly or partly with a digital signal processor (DSP), ASIC, programmable logic device (PLD), or other electronic circuits, or any combination of them.

Several embodiments and their variations have been described above. In one aspect of those embodiments, the proposed techniques make it possible to accurately determine whether a person seen in pictures has picked up an object.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A method for recognizing actions, comprising:
   obtaining, by an information processing apparatus, a picture containing an image of a person from an imaging device, as well as first data indicating distance of the person and other subjects seen in the picture from the imaging device on an individual pixel basis, second data indicating distance of a wrist of the person from the imaging device, and third data indicating a coordinate position of the wrist in the picture;
   extracting, by the information processing apparatus, a set of pixels from the obtained picture whose respective coordinates fall within a specified coordinate range defined around the coordinate position of the wrist and whose respective distances fall within a specified distance range defined around the distance of the wrist; and
   determining whether the person has picked up an object, based on a ratio representing how many of the extracted pixels have a distinctive color tone.

2. The method according to claim 1, wherein the extracting pixels and the determining whether the person has picked up an object are performed upon detection of movement of the wrist out of a specified area in a view space.

3. The method according to claim 2, wherein the method further comprises detecting presence of the wrist in the specified area in the view space, by testing whether the coordinate position of the wrist falls within an area previously defined as part of pictures to be taken by the imaging device.

4. The method according to claim 1, wherein:
   the obtaining a picture, first data, second data, and third data and the extracting pixels are performed at first and second occasions, the first occasion being when the wrist has moved into a specified area in a view space, the second occasion being when the wrist has moved out of the specified area;
   the extracting includes extracting first pixels from a first picture obtained on the first occasion, and extracting second pixels from a second picture obtained on the second occasion;
   the method further comprises comparing a first ratio representing how many of the first pixels have the distinctive color tone with a second ratio representing how many of the second pixels have the distinctive color tone; and
   the determining whether the person has picked up an object is based on a result of the comparing the first ratio with the second ratio.

5. The method according to claim 4, wherein the method further comprises calculating the distinctive color tone from color code values of the first pixels extracted on the first occasion.

6. The method according to claim 1, wherein the method further comprises calculating the specified coordinate range from relative positions between the coordinate position of the wrist and another body part located between a shoulder and finger tips of the person.

7. The method according to claim 1, wherein the distinctive color tone is a range of color code values representing skin colors.

8. An action recognition apparatus comprising:
a processor configured to perform a process including:
obtaining a picture containing an image of a person from an imaging device, as well as first data indicating distance of the person and other subjects seen in the picture from the imaging device on an individual pixel basis, second data indicating distance of a wrist of the person from the imaging device, and third data indicating a coordinate position of the wrist in the picture;
extracting a set of pixels from the obtained picture whose respective coordinates fall within a specified coordinate range defined around the coordinate position of the wrist and whose respective distances fall within a specified distance range defined around the distance of the wrist; and
determining whether the person has picked up an object, based on a ratio representing how many of the extracted pixels have a distinctive color tone.

9. The action recognition apparatus according to claim 8, wherein:
the extracting pixels is performed upon detection of movement of the wrist out of a specified area in a view space; and
the determining whether the person has picked up an object is performed based on the extracted pixels.

10. The action recognition apparatus according to claim 9, wherein the process further includes detecting presence of the wrist in the specified area in the view space, by testing whether the coordinate position of the wrist falls within an area previously defined as part of pictures to be taken by the imaging device.

11. The action recognition apparatus according to claim 8, wherein:
the obtaining a picture, first data, second data, and third data and the extracting pixels are performed at first and second occasions, the first occasion being when the wrist has moved into a specified area in a view space, the second occasion being when the wrist has moved out of the specified area;
the extracting includes extracting first pixels from a first picture obtained on the first occasion, and extracting second pixels from a second picture obtained on the second occasion;
the process further includes comparing a first ratio representing how many of the first pixels have the distinctive color tone with a second ratio representing how many of the second pixels have the distinctive color tone; and
the determining whether the person has picked up an object is based on a result of the comparing the first ratio with the second ratio.

12. The action recognition apparatus according to claim 11, wherein the process further includes calculating the distinctive color tone from color code values of the first pixels extracted on the first occasion.

13. The action recognition apparatus according to claim 8, wherein the process further includes calculating the specified coordinate range from relative positions between the coordinate position of the wrist and another body part located between a shoulder and finger tips of the person.

14. The action recognition apparatus according to claim 8, wherein the distinctive color tone is a range of color code values representing skin colors.

15. A non-transitory computer-readable storage medium storing a program for recognizing actions, wherein the program causes a computer to perform a process comprising:
obtaining a picture containing an image of a person from an imaging device, as well as first data indicating distance of the person and other subjects seen in the picture from the imaging device on an individual pixel basis, second data indicating distance of a wrist of the person from the imaging device, and third data indicating a coordinate position of the wrist in the picture;
extracting a set of pixels from the obtained picture whose respective coordinates fall within a specified coordinate range defined around the coordinate position of the wrist and whose respective distances fall within a specified distance range defined around the distance of the wrist; and
determining whether the person has picked up an object, based on a ratio representing how many of the extracted pixels have a distinctive color tone.

* * * * *